June 13, 1933.   W. H. POWELL   1,913,952

DYNAMO-ELECTRIC MACHINE REGULATION

Filed July 26, 1930

Inventor
W. H. Powell
by
Attorney

Patented June 13, 1933

1,913,952

UNITED STATES PATENT OFFICE

WILLIAM H. POWELL, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

DYNAMO-ELECTRIC MACHINE REGULATION

Application filed July 26, 1930. Serial No. 470,888.

The present invention is concerned with the operation and regulation of dynamo-electric machines, and it is more particularly concerned with the design and provision of apparatus embodying devices for insuring an accelerated or quickened rate of response or change of the magnetizing fields of such machines.

Due to the inductance of the circuit of the field winding of a dynamo-electric machine, there is often considerable delay, particularly in the case of machines of relatively great power and slower operating speeds, in the attainment of the desired field energizing flux and resultant voltage, in the case of a generator, and of speed, in the case of a motor, following the adjustment of the regulator or controller used for the purpose of securing the desired variation in the operating characteristics of the machine. Various expedients have been utilized in the past in attempts to secure quick voltage or speed response in the regulation of such machines, these expedients involving a considerable degree of complication of regulating devices for the machine.

The present invention contemplates the provision of an improved system of control or regulation for dynamo-electric machines which is effective to secure in a simple and efficient manner quickened or accelerated response in variations of the magnetic flux of the machine, following the adjustment of the controlling apparatus which serves to vary the current producing such magnetic flux. The invention finds a particularly useful embodiment in the control of direct current machines, particularly motors of relatively large size and slower operating speeds, such as are required for rolling mill and hoist service, where it is essential that the motors be started and stopped and, in many cases, reversed, and generally where the operating speeds are varied with great frequency. Service of this character demands an extremely simple control apparatus with a minimum number of operating parts, so as to most thoroughly avoid possible shutdown periods in the service of the machines. And a characteristic of embodiments of the present invention is that the stored energy discharged by the field energizing winding on the reduction of the energizing current in the same is dissipated in such a manner as to beneficially utilize a substantial portion of such energy.

It is an object of the present invention to provide an improved system of control or regulation for dynamo-electric machines which is capable of improving or quickening the responsiveness of the machines in the matter of attainment of different stable operating characteristics.

It is a further object of the present invention to provide such a system of control or regulation for dynamo-electric machines which utilizes an arrangement of field windings including a section thereof so arranged as to be capable of producing a useful energizing effect during the normal operation or stable current conditions of the machine to be controlled, and which, in addition, is capable of forcing or insuring a quickened response or rate of variation of the current in the field winding of the machine to be controlled, while at the same time insuring the beneficial utilization of the energy of discharge of such field winding.

The above and other objects and advantages are attained by the present invention, various novel features of which will be apparent from the description and drawing herein, disclosing embodiments of the invention, and will be more particularly pointed out in the claims.

Figure 1:
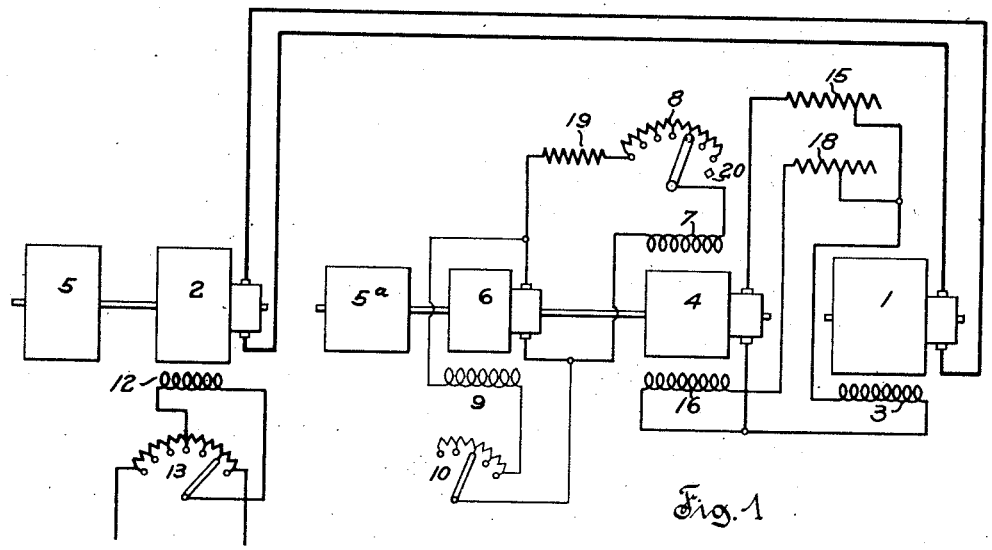
Fig. 1 is a diagrammatic illustration of a system embodying features of the present invention.

In accordance with Fig. 1, there is disclosed a system wherein the invention is utilized in connection with the control of a direct current motor 1, which may be considered a motor of relatively great power such as is utilized for driving a rolling mill or like load, the armature of the motor being supplied with direct current energy by a generator 2, and the main field winding 3 of the motor being of the shunt type supplied from a separate source, such as an exciter 4 which may be driven by the prime mover or motor 5 driving the main generator 2, if the speed of such motor is sufficiently high; or the exciter 4 is preferably driven by a separate high speed prime mover or motor 5ᵃ, preferably of the constant speed type.

The motor 5ᵃ may also drive an auxiliary, preferably constant potential, generator 6 which supplies energy to a shunt type field winding 7 on the main exciter 4, and a resistance controller 8, of conventional type, may be provided for varying the current in the circuit of the winding 7. The auxiliary exciter 6 may have its field energized by a shunt winding 9, the circuit of the latter being provided with suitable means, such as the resistance controller 10, for insuring the required energizing current in the field winding 9.

The field of the main generator 2 is energized by a winding 12 of the shunt type, preferably separately excited from a suitable source of constant potential, such as the auxiliary or pilot exciter 6. A controller 13, preferably of the variable and reversible type, is provided in the circuit of the winding 12 for the purpose of suitably varying and reversing the potential at the terminals of the generator 2, in accordance with the desire for operation of the main motor in a forward or reverse direction and at different operating speeds.

The ordinary control of the main motor 1 up to a predetermined operating speed thereof may be secured through variation of the potential applied to its armature, this desired variation being secured by a suitable adjustment of the resistance controller 13 in the circuit of the field winding 12 of the generator 2; and desired higher operating speeds of the motor 1 may be secured by suitably reducing the energization of the motor field, by decreasing the potential across the terminals of the field winding 3, this being accomplished, as indicated, by adjustment of the resistance controller 8 in the circuit of the field winding 7 of the exciter 4, to thereby vary the potential generated by the latter.

While a certain speed or degree of variation or response in the effective current in the field winding 3, and hence in the magnetic flux in the field of the motor 1, is attainable, in the above described operation of the motor, without any further operating provisions or expedients, a resistance 15, of a suitably selected or adjusted relatively high resistance value, is provided in series with the field winding 3 and the armature of the exciter 4. The presence of this resistance to a very appreciable extent decreases the time constant of the circuit of the field winding 3, that is, the ratio between the inductance and the resistance of such circuit, and hence increases the speed of response of the flux of the motor field.

As a further means of quickening or accelerating the response of the field flux of the motor 1, due to the winding 3, on variation of the potential generated by the exciter 4, an auxiliary or forcing field winding 16 is provided on the latter, this winding being connected in shunt to the winding 3, in the normal circuit of the exciter 4, that is, both windings are in series with the resistance 15. The winding 16 is so disposed on the field of the exciter 4 that, during normal or stable current conditions of operation of the system, this winding is cumulative with respect to the winding 7 in producing the desired magnetizing flux in the field of the exciter 4.

A definitely adjusted resistance 18 is preferably permanently included in the circuit of the auxiliary winding 16 for suitably limiting the current in and adjusting the time constant of the winding 16, and for insuring, under normal conditions, the desired division of current between this winding and the field winding 3 of the motor 1. Likewise, a suitably adjusted permanent resistance 19 is preferably included in the circuit of the field winding 7 of the main exciter for definitely limiting the maximum current value in this circuit.

While the resistance controller 8 in the circuit of the energizing winding 7 of the exciter 4 is shown as being of the manually operated type, nevertheless, this controller may well be of a conventional automatic type involving a bank of contactors which successively open and close short-circuits about sections of resistance in the circuit of the winding 7. Suitable means may be provided, such as a stop 20 on the controller 8 which prevents open circuit condition and insures that the normal current in the circuit of the winding 7 will not drop below a predetermined minimum, and hence that the normal voltage generated at the terminals of the exciter 4 will not drop below a predetermined value and that there will accordingly be sufficient energization of the field 3 of the motor 1 to prevent the same from over-speeding or running away.

In the operation of the system disclosed in Fig. 1, the speed of the motor 1 may be increased appropriately to a predetermined value, through variation, by adjustment of controller 13 in the field circuit of generator 2, of the potential applied to the armature of the motor; and to further increase the speed of the motor, the energization of the motor field winding 3 is reduced by increasing the resistance in the circuit of the field winding 7 of the exciter 4, the controller 8 being adjusted manually or automatically to secure this desired decrease in current in the winding 7. The first effect of a decrease in the energizing current of the field winding 7 is a decrease in the potential generated by the armature of the exciter 4.

Due to the inductance of the winding 3, the current in the circuit of such winding does not decrease immediately following a decrease in the potential generated by the exciter 4; but this original current tends to persist, for, while the electromotive force generated by the exciter 4 is reduced, still the electromotive force at the terminals of the winding 3 tends to continue and dies down relatively slowly, the stored energy of this winding being discharged or dissipated gradually, a portion through the branch including resistance 15 and the armature 4, and the remainder through the circuit including the resistance 18 and the forcing field winding 16 of the exciter 4. However, the direction of the current flowing in the latter winding during the dissipation of the energy of discharge of the winding 3 is now, due to existing higher potential at the terminals of the winding 3 than at the terminals of the exciter 4, opposite to that of the current flowing during stable current operation; and hence, this auxiliary or forcing winding 16 produces a magnetizing effect which is differential to that produced by the field winding 7, and it serves to quickly de-magnetize the field of and reduce the voltage generated by exciter 4. With the proper design of the auxiliary or forcing winding 16 as to number of turns and resistance of its circuit relative to that of the circuit of the armature 4 and the resistance 15, the winding 16 is effective to preponderate over the winding 7 and to thus actually reverse the effective magnetizing field of the exciter, causing the latter to now act as a motor, thus returning energy to the system while absorbing or dissipating energy discharged by the field winding 3 of the motor.

As the current in the circuit of the winding 3 naturally dies down, the de-magnetizing effect of the auxiliary winding 16 decreases, passing through a value which just neutralizes the effect of the winding 7, and finally decreases to zero; and eventually, incident to full discharge of the stored energy of the field winding 3, the energizing effect of the winding 7, with its circuit adjusted for minimum current therein, preponderates to build up the voltage of exciter 4 as a generator, and the current in the winding 16 increases to its normal value corresponding to stable current conditions, the energizing effects of the winding 16 again supplementing those due to the winding 7.

The general result is that the energy of discharge of the motor field winding 3 is quickly absorbed, particularly through the motor effect of the exciter 4, thus permitting the field flux of the motor 1 due to the winding 3 to die down with increased or greater speed or responsiveness; and this feature whereby the exciter 4 is caused to operate as a motor absorbing energy of discharge of the field winding 3, greatly contributes to the efficient utilization of the power of the system.

In order to slow down the motor 1 from its high speed, under which condition the resistance controller 8 is in such position as to insure minimum current in the field winding 7 of the exciter 4, the energizing field due to the field winding 7 is increased to the desired extent, through operation of the resistance controller 8, the voltage generated by the exciter 4 increasing with a relatively quick response to its increased field energization. However, due to the relatively high time constant of the field winding 3, the current in the circuit of the latter is relatively slow to build up; but, since the time constant of the auxiliary or forcing winding 16 is less than that of the motor field winding 3, the winding 16 thus becomes effective to further increase the potential of the exciter 4, building the same up to a value higher than the normal voltage corresponding to stable current conditions for the particular setting of the resistance controller 8. This increased potential thus available at the terminals of the exciter 4 is effective at the terminals of the motor field winding 3 to assist in speeding up or quickening the response of this winding in the matter of causing the desired increased current to flow therein. As the current in the winding 3 builds up, that in the winding 16 dies down to a corresponding extent until normal balance of distribution between the two parallel connected windings is established, under which circumstances the current flowing in the winding 3 is stable at the value required to produce the desired magnetizing effect of the field of motor 1.

It will thus be apparent that the auxiliary or forcing winding 16 has, in addition to its characteristic of being normally effective to assist in producing the desired field energizing effect on the exciter, the effect of causing the current in the field winding 3 of the motor to both build up and die down with increased speed of response to the controlling effect initiated by the controller 8 or other device provided for the purpose of securing the desired speed control of the motor.

Figure 2:
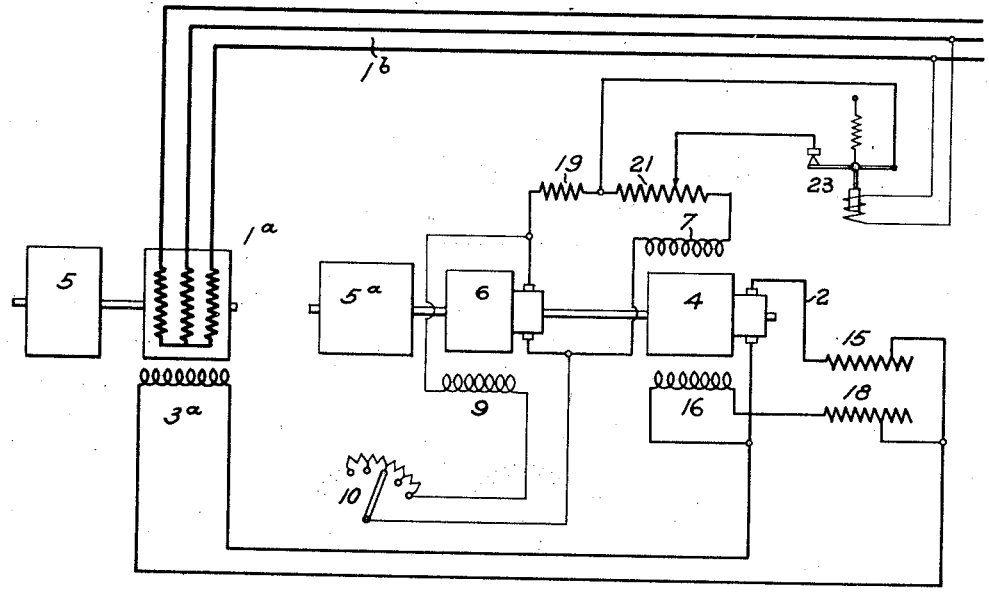
Fig. 2 is a diagrammatic showing of a modified system including features of the present invention.

In the modification shown in Fig. 2, features of the invention are utilized in the regulation of an alternating current generator 1ª supplying a polyphase distribution system 1ᵇ. The field winding 3ª of the generator is supplied from the exciter 4 which may be driven by the prime mover or motor 5 driving the generator 1ª, assuming that the desired speed of the exciter can be readily attained in this manner, or by a separate high speed prime mover or motor 5ª, as indicated. As described hereinabove, the exciter 4 is provided with a main field winding 7 excited from an auxiliary exciter 6, and an auxiliary or forcing field winding 16 in the circuit of the armature of the exciter and a high speed resistance 15, and is connected in parallel with the winding 3ª of the generator 1ª. The winding 16 is normally cumulative with respect to the winding 7; and the energizing current in the winding 3ª of the generator is controlled primarily through the automatic regulation of the current in the main winding 7 of the exciter 4, this latter winding having a resistance 21 in series therewith, and there being provided a conventional type of automatic voltage regulator 23, preferably of the vibrating type, responsive to the voltage of the distribution circuit 2ª to maintain substantially constant voltage on such circuit.

In the operation of the system described hereinabove, the movable contact arm of the voltage regulator 23 vibrates into and out of closed position at a rate determined by the departure from predetermined line voltage conditions, the effect of these vibrations determining the average energization of the exciter field due to the winding 7, and hence the potential generated by the exciter and thereby the magnetizing effect of the field winding 3ª of the generator 1ª.

In the control of the exciter 4 to maintain substantially constant voltage on the line supplied by the generator 1ª, the effect of opening the circuit of the voltage regulator 23, due to increase in line voltage, is to insert resistance 21 in the circuit of winding 7, causing a reduction of the magnetic flux in the field of the exciter 4 due to the latter winding, thus reducing the voltage generated by the exciter 4 and thereby tending to immediately reduce the current in the circuit of the field winding 3ª of the generator 1ª. However, because of the relatively great time constant of the winding 3ª, there is a substantial time interval present in the dying-down of the current in the circuit of this latter winding, in spite of the presence therein of the high speed resistance 15. On such a reduction of the potential generated by the exciter 4, the stored energy of the field winding 3ª of the generator is such as to cause current to flow in reverse direction in the winding 16, thereby exerting a de-magnetizing effect on the field of the exciter 4, the magnitude of this effect being dependent on the degree of the initial reduction in the voltage generated by such exciter; and the de-magnetizing effect can be sufficiently great to wholly neutralize the effect of the main field 7 of the exciter and even to produce an effective magnetization of the field of the exciter in an opposite direction, with the result that the latter then acts as a motor supplied with current due to the discharge of the stored energy of the field winding 3ª. As the field 3ª becomes discharged, the de-magnetizing effect of the winding 16 decreases and the effective magnetization of the exciter then builds up to its normal value, with the winding 16 assisting the winding 7, corresponding to the new stabilized current conditions prevailing.

On such operation of the voltage responsive regulator as causes a substantial increase in the effective magnetization of the field of the exciter 4, due to the winding 7 thereof, the time constant of the field winding 3ª tends to prevent the current from immediately building up in such winding to its desired stable value; but the increased current in the circuit of the winding 16, due to its time constant being smaller than that of the winding 3ª, causes a quick increase in the total magnetization of the field of the exciter 4, thus insuring an initial increase in voltage at the terminals of the field winding 3ª, and a corresponding quickening of increase of the rate of building-up of the current in this latter winding, the current in the winding 16 thereafter dropping and that in the winding 3ª rising to their respective normal values corresponding to the new stable current conditions.

It will be apparent that, in the event of either increasing or decreasing the potential of the generator 1ª, the auxiliary or forcing winding 16 is effective to increase the speed of response of the current in the circuit of the field winding 3ª and hasten the attainment of the required field flux and voltage of the generator 1ª.

An adjusting device may be provided for cooperation with taps on the resistance 21 for adjusting said resistance to different fixed values. Likewise, any further type of resistance controller may be provided for adjusting the resistance of the circuit of the field winding 7 to any desired fixed value.

It should be understood that the invention claimed herein is not limited to the exact details of construction and design of the several embodiments set forth herein, for obvious modifications will be apparent to persons skilled in the art without departing from the spirit and scope of the invention as defined by the appended claims.

It is claimed and desired to secure by Letters Patent:

1. In combination, a dynamo-electric machine having a field winding, an exciter for supplying said winding, main and auxiliary field windings on said exciter, an auxiliary exciter for supplying said main field winding, said auxiliary field winding being normally cumulative and connected in parallel with and having a time constant less than that of said field winding of said dynamo-electric machine, and means for varying the energizing effect of the main field winding on said exciter to thereby effect desired regulation of said dynamo-electric machine.

2. In combination, a dynamo-electric machine having a field winding, an exciter for supplying said winding, main and auxiliary field windings on said exciter, an auxiliary exciter for supplying said main field winding, said auxiliary field winding being normally cumulative and connected in parallel with said field winding of said dynamo-electric machine, a high resistance in series with both of said parallel connected windings, and means for varying the energizing effect of said main field winding on said exciter to thereby effect desired regulation of said dynamo-electric machine.

3. In combination, a dynamo-electric machine having a field winding, an exciter for supplying said winding, main and auxiliary field windings on said exciter, said auxiliary field winding being of the shunt type and connected in parallel with the field winding of said dynamo-electric machine, with a high resistance in the common circuit of said latter two windings, means for varying the energizing effect of said main field winding to thereby effect desired regulation of said dynamo-electric machine, said auxiliary field winding being effective to normally act cumulatively with the main field winding on said exciter and differential thereto during operations of decreasing the energizing effect of the field winding of said dynamo-electric machine.

4. In combination, a dynamo-electric machine having a field winding, an exciter for supplying said winding, main and auxiliary field windings on said exciter, a high speed resistance permanently in series with said field winding of said dynamo-electric machine, and means for varying the energization of said main field winding to thereby effect desired regulation of said dynamo-electric machine, said auxiliary field winding on the exciter being of the self-excited shunt type and connected to said exciter through said high speed resistance and being normally cumulative and automatically operative to produce a differential energizing effect on said exciter during the operation of reducing the effective energization of the field winding of said dynamo-electric machine.

5. In combination, a dynamo-electric machine having a field winding, an exciter for supplying said winding, main and auxiliary field windings for said exciter, an auxiliary exciter for supplying the main field winding of said first exciter, a relatively high resistance, said auxiliary field winding and the field winding of said dynamo-electric machine being connected in parallel in the circuit of said main exciter through said relatively high resistance, and means for varying the current flowing in said main field winding of said exciter to thereby effect desired regulation of said dynamo-electric machine.

6. In combination, a dynamo-electric machine having a field winding, an exciter for supplying said winding, a separately excited main field winding and an auxiliary field winding for said exciter, an auxiliary exciter for supplying said main field winding, said auxiliary field winding being connected in parallel with the field winding of said dynamo-electric machine, and the time constant of said auxiliary field winding of the exciter being less than that of the field winding of said dynamo-electric machine, and means for varying the energizing effect of said main field winding to thereby effect desired regulation of said dynamo-electric machine.

7. In combination, a dynamo-electric machine having a field winding, an exciter for supplying said winding, a separately excited main field winding and an auxiliary field winding for said exciter, said auxiliary field winding having a time constant less than that of the field winding of said dynamo-electric machine, a high speed resistance, and said auxiliary field winding and the field winding of said dynamo-electric machine being connected in parallel in the circuit of said exciter through said high speed resistance, and means for varying the energizing effect of the main field winding of said exciter to thereby effect desired regulation of said dynamo-electric machine.

8. In combination, a dynamo-electric machine having a field winding, an exciter for supplying said field winding, a main field winding on said exciter, means for controlling the energizing effects of said latter winding to thereby control the energizing effects of the field winding of said dynamo-electric machine, and means for increasing the responsiveness of said latter energizing effects, said means comprising a field winding on said exciter whose energizing effect is cumulative during increase of the energizing effect of the field winding of said dynamo-electric machine and is differential during decrease of the energizing effect of the latter field winding.

9. In combination, a dynamo-electric machine having a field winding, an exciter for supplying said field winding, a main field winding on said exciter, means for controlling the energizing effects of the field winding of said dynamo-electric machine, and means for increasing the responsiveness of said latter energizing effects, said means comprising a self-excited shunt field winding on said exciter whose energizing effect is cumulative during increase of the energizing effect of the field winding of said dynamo-electric machine and is differential during decrease of the energizing effect of the latter field winding.

10. In combination, a dynamo-electric machine having a field winding, an exciter for supplying said winding, a high-speed resistance in the armature circuit of said exciter and said field winding, main and auxiliary field windings for said exciter, a separate source of excitation for the main field winding of said exciter, said auxiliary field winding being of the self-excited shunt type and connected to said exciter through said resistance, and means for varying the current supplied by said separate source to said main field winding to thereby vary the voltage generated by said exciter while at all times insuring the presence of a predetermined appreciable current in said main field winding.

11. In combination, a dynamo-electric machine having a field winding, an exciter for supplying said field winding, said exciter being provided with a separately excited main field winding, and means for varying the electrical energy supplied by said exciter to the field winding of said dynamo-electric machine to thereby effect desired regulation of said latter machine, and means comprising an auxiliary field winding of the shunt type on said exciter for absorbing a substantial portion of the energy of discharge of the field winding of said dynamo-electric machine.

12. In combination, a dynamo-electric machine having a field winding, an exciter for supplying said field winding, said exciter being provided with a main field winding, means for controlling the energizing effect of said main field winding to thereby effect desired regulation of said dynamo-electric machine, and means comprising an auxiliary and normally cumulative field winding of the shunt type on said exciter for causing said exciter to act as a motor during a portion of the period of discharge of the field winding of said dynamo-electric machine.

13. In combination, a dynamo-electric machine having a field winding, an exciter for supplying said field winding, said exciter being provided with a main field winding, an auxiliary exciter for supplying said main field winding, means for controlling the energizing effect of said main field winding to thereby effect desired regulation of said dynamo-electric machine, means comprising an auxiliary and normally-cumulative field winding of the shunt type on said exciter for causing said exciter to act as a motor during a portion of the period of discharge of the field winding of said dynamo-electric machine, and means for preventing undesirable reversal of field energization of said exciter following dissipation of the energy of discharge of the field winding of said dynamo-electric machine.

14. In combination, a dynamo-electric machine having a field winding, an exciter for supplying said field winding, said exciter being provided with a separately excited main field winding, means for controlling the energizing effect of said main field winding to thereby effect desired regulation of said dynamo-electric machine, means comprising an auxiliary and normally cumulative field winding of the shunt type on said exciter for causing said exciter to act as a motor during a portion of the period of discharge of the field winding of said dynamo-electric machine, and means for preventing undesirable reversal of field energization of said exciter following dissipation of the energy of discharge of the field winding of said dynamo-electric machine, said means comprising instrumentalities associated with said controlling means to insure the presence at all times of a predetermined minimum energizing effect of said main field winding.

15. In combination, a dynamo-electric machine having a field winding, an exciter for supplying said field winding, said exciter being provided with a separately excited main field winding, means for varying the energizing effect of said main field winding to thereby effect desired regulation of said dynamo-electric machine, and means comprising an auxiliary field winding of the self-excited shunt type on said exciter and a high resistance in series with said latter winding and the armature of said exciter for increasing the speed of response during building up of the current in the field winding of said dynamo-electric machine and to absorb a substantial portion of the energy of discharge of said latter winding and to thereby demagnetize the field of said exciter and cause the latter to act as a motor during a portion of the period of dying-down of the current in the field winding of said dynamo-electric machine.

16. In combination, a dynamo-electric machine having a field energizing winding, an exciter for said winding, means for regulating the electromotive force at the terminals of said machine due to said winding, means responsive to a voltage-increase operation of said regulating means for causing a further voltage-augmenting effect on said machine and responsive to a voltage-decreasing operation of said regulating means for causing a quickening of the rate of dying-down of said voltage, said means including a relatively high resistance and a normally cumulative self-excited shunt winding on said exciter having a time constant less than that of said winding on said dynamo-electric machine and connected in circuit through said relatively high resistance during operations of both increase and decrease of the energization of the field of said dynamo-electric machine.

17. In combination, a direct current motor having a field winding, an exciter for supplying said winding, main and auxiliary field windings for said exciter, a separate source for supplying the main field winding of said exciter, a relatively high resistance, and means for varying the energizing effect of the main field winding of said exciter to thereby effect the desired regulation of said dynamo-electric machine, said auxiliary field winding and the field winding of said dynamo-electric machine being connected in parallel in the armature circuit of said exciter through said relatively high-speed resistance, the time constant of the circuit of said auxiliary field winding being less than that of the field winding of said dynamo-electric machine whereby said auxiliary field winding is effective to absorb energy of discharge of the field winding of said dynamo-electric machine during a voltage-decreasing operation thereof and thereby produce a differential magnetizing effect on the field of said exciter which quickens the responsiveness to said operation.

18. In combination, a dynamo-electric machine having a field winding, an exciter for supplying said winding, said exciter having a plurality of field windings, an auxiliary exciter for supplying one of the field windings of said main exciter, a relatively high resistance, another of said field windings of said main exciter and the field winding of said dynamo-electric machine being connected in parallel in the circuit of said main exciter through said relatively high resistance, and means for varying the current flowing in said separately excited field winding of said main exciter to thereby effect desired regulation of said dynamo-electric machine.

In testimony whereof, the signature of the inventor is affixed hereto.

WILLIAM H. POWELL.